(12) United States Patent
Barta et al.

(10) Patent No.: US 8,072,982 B2
(45) Date of Patent: Dec. 6, 2011

(54) GATEWAY ENTITY FOR DISTINGUISHING BETWEEN DIFFERENT MESSAGES WITHOUT FULL KNOWLEDGE OF UNDERLYING PROTOCOL

(75) Inventors: Péter Barta, Tenk (HU); Robert Szabo, Budapest (HU); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 12/161,815

(22) PCT Filed: Jan. 25, 2006

(86) PCT No.: PCT/EP2006/000633
§ 371 (c)(1),
(2), (4) Date: Mar. 2, 2010

(87) PCT Pub. No.: WO2007/085271
PCT Pub. Date: Aug. 2, 2007

(65) Prior Publication Data
US 2010/0254394 A1    Oct. 7, 2010

(51) Int. Cl.
*H04L 12/28* (2006.01)
(52) U.S. Cl. .......... 370/394; 370/235; 370/412
(58) Field of Classification Search .......... 370/229–240, 370/394, 412
See application file for complete search history.

(56) References Cited

U.S. PATENT DOCUMENTS

| | | | |
|---|---|---|---|
| 6,360,270 B1 | 3/2002 | Cherkasova | |
| 2003/0028634 A1* | 2/2003 | Oshizawa | 709/224 |
| 2003/0133465 A1* | 7/2003 | Alfano | 370/412 |
| 2005/0094847 A1* | 5/2005 | Venkatesan et al. | 382/100 |
| 2005/0220039 A1* | 10/2005 | Hoshino et al. | 370/261 |
| 2008/0228856 A1* | 9/2008 | Sano | 709/201 |
| 2008/0270403 A1* | 10/2008 | Bookman et al. | 707/7 |
| 2009/0154599 A1* | 6/2009 | Siti et al. | 375/320 |
| 2010/0189123 A1* | 7/2010 | Alfano | 370/412 |
| 2010/0278045 A1* | 11/2010 | Xiang | 370/235 |

FOREIGN PATENT DOCUMENTS

EP    1 599 009 A    11/2005

OTHER PUBLICATIONS

Andreasen B Foster Cisco Systems F: "Media Gateway Control Protocol (MGCP), Version 1.0", IETF Standard, Internet Engineering Task, Force, IETF, CH, Jan. 2003, XP015009218, ISSN: 0000-0003, section 3.5.1-section 3.5.6, section 4.2-section 4.3.

(Continued)

*Primary Examiner* — Ayaz Sheikh
*Assistant Examiner* — Mounir Moutaouakil

(57) ABSTRACT

A gateway and method for distinguishing between different types of messages without requiring the gateway to be fully aware of the communication protocol. The gateway passes through messages from application entities to network elements and vice versa. The gateway determines a transaction identifier or sequence step information, and compares the transaction identifier or sequence step information with ones previously stored. The comparison result is used to determine whether a message is an initial message or a response message to the initial message, and whether the message is a first or subsequent message, respectively.

36 Claims, 10 Drawing Sheets

OTHER PUBLICATIONS

Chen Yan et al: "An investigation of stage-based parallel programming model for stateful network services on COTS platforms", Parallel and Distributed Computing, Applications and Technologies, 2003. PDCAT'2003. Proceedings of the Fourth International Conference on Aug. 27-29, 2003, Piscataway, NJ, USA,IEEE, Aug. 27, 2003, pp. 511-517, XP010661329, ISBN: 0-7803-7840-7, section II, section V, figure 5.

Conrad P T et al: "Reliable IP telephony applications with SIP using RSerPool", Proceedings of the World Multiconference on Systemics, Cybernetics and Informatics, XX, XX, vol. 10, 2002, pp. 352-356, XP002376481, section 3, section 4, section 5, figure 3.

* cited by examiner

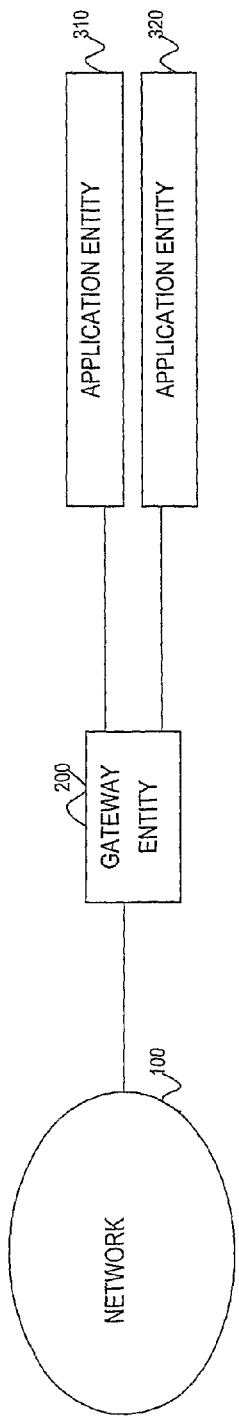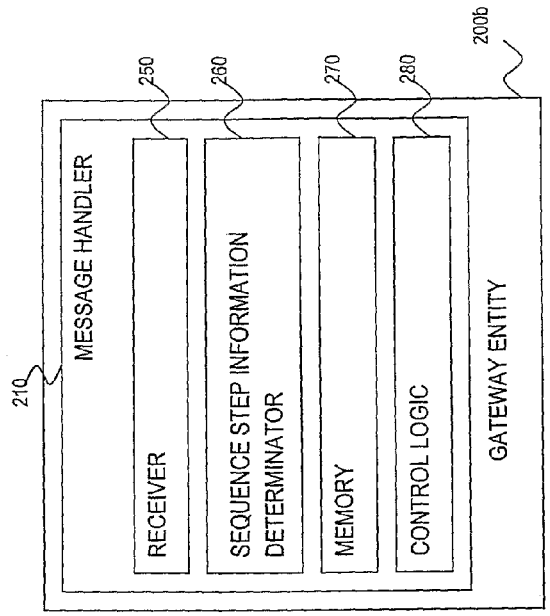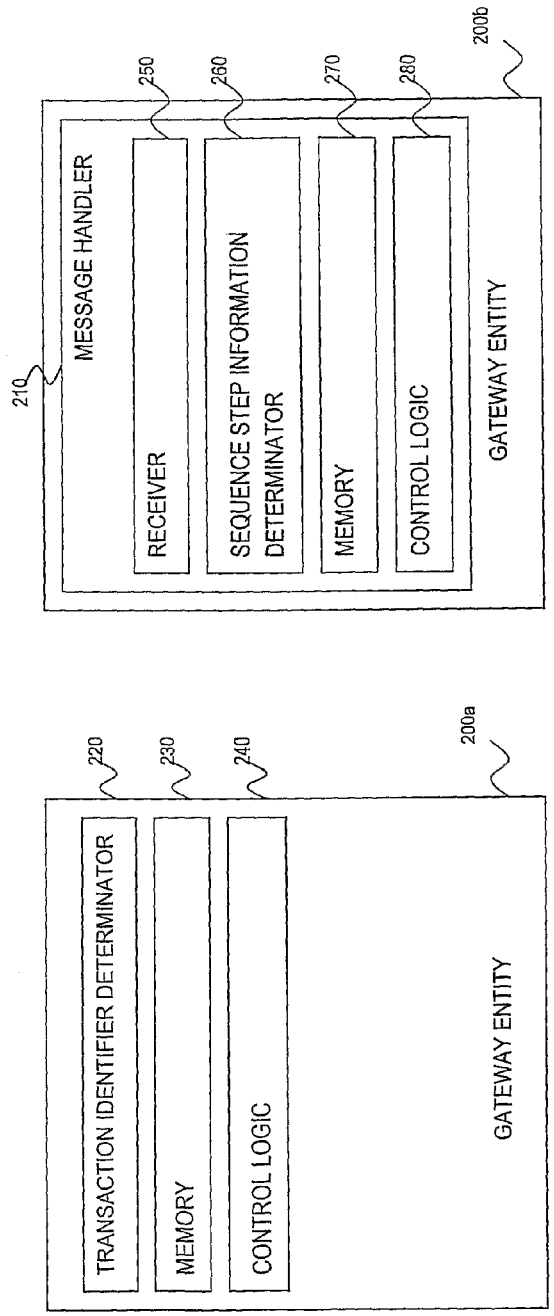
FIG. 1
FIG. 2b
FIG. 2a

FIG. 10b

GATEWAY ENTITY FOR DISTINGUISHING BETWEEN DIFFERENT MESSAGES WITHOUT FULL KNOWLEDGE OF UNDERLYING PROTOCOL

FIELD OF THE INVENTION

The present invention relates to a gateway entity connectable to a communication network and a method for controlling said gateway entity.

TECHNOLOGICAL BACKGROUND

In the field of communication it is known to provide entities of different functionality in a communication system that may comprise one or more networks. An entity within the meaning of the present application and claims is a device or a plurality of devices for providing a particular functionality, e.g. a single unit or node, or a collection of units or nodes that act together. One known type of entity is a gateway entity that acts as a gate between one or more entities on one side and one or more entities on the other side. For example, gateway entities can be provided at the transition between two different networks, for allowing communication between the entities of the two networks. Another example of a gateway entity is in a context where a plurality of application components are provided in a redundant structure (also referred to as a high availability system or fault tolerant systems), connected to a gateway entity that offers entities of an outside network access to the application components, where one application component can take over when another fails.

A basic problem with such gateway entities is their complexity. Namely, the gateway entities are designed to process messages being sent between the entities on either side, such that the gateway entities must be able to understand the protocol being used for the messages.

For example, in the case of a gateway entity between two different networks, the gateway entity should be arranged to implement every protocol used for messages passed by the gateway entity.

In redundant systems, further problems occur in the gateways.

Due to the complexity of telecommunication networks, there are various reasons for possible failures, which may occur in the network components themselves, e.g. the hardware or the software running on those components but may also be triggered by environmental effects on the network components, preventing users from receiving the offered services.

Service retainability is the key to success of these networks, which means that even during the failure process, when a backup process takes over to provide for continuous service, there is no or only a minimal impact on the user receiving the service.

Offering telecom grade high availability in general entails hardware and software components that are designed to have or support high availability functions. These kinds of platforms have telecom grade operating systems and specifically written applications to make use of high availability functions. The design and implementation process of such operating systems and applications are long and expensive.

There are many high availability solutions that can be categorized as being stateless or stateful depending on the state of the application preserved during failover so that they can continue smoothly, or those states have to be re-built after failover. Stateful solutions are more appropriate for smooth services, because re-building states may take a considerable amount of time possibly leading to service disruption or degradation.

For example a stateful high availability system may comprise one or more primary and backup components and additional mechanisms to ensure that states of the primary components are replicated to the backup components. The most widely known system uses the hot-standby or 1+1 redundancy scheme, in which a primary and backup component work in a mated pair relationship and the primary component serves all requests, while the backup component waits to take over when the primary component goes down due to a failure. During normal operation application states from the primary component are periodically copied to the backup component to have an up-to-date version in case the primary component stops. The failover process changes the role of the backup component to be the primary component as long as the failed primary component has recovered.

Another example is a fault tolerant system, in which, two or more identical components work parallel with the same input data. The outputs of these components are compared to identify if there is a faulty one among them. These dual or multiple modular redundant systems have redundant hardware setups and are inherently stateful as each component processes the same data in exact parallelism with other components. Therefore, if one component fails, it can be disabled, while the others can provide the service immediately as there is no switchover time or other delay in its simple failover mechanism.

However, the approaches discussed above that are built up following the primary-backup principle have to apply additional mechanisms to be able to replicate states in the backup component. State replication imposes several requirements, e.g. states need to be consistent and up-to-date in corresponding components, the mechanism that is responsible for moving states has to be resilient in itself. Therefore, for state replication, both the operating system and the application have to be designed to support this feature. The operating system has to implement and handle resilient databases and processes, manage failover of these ones and also support various high availability functions, like fault detection and failover control logic. Further, applications have to be specifically coded to assist the state replication. Therefore, this implies a long and expensive design and implementation process and a complex system with a long time to market cycle. Moreover, neither the operating systems nor the applications are portable among different platforms.

Furthermore, dual or multiple modular redundant systems require exact parallel processing in each component, which generally is extremely hard to achieve. It is not only that instructions have to be processed simultaneously in terms of clock cycle in different processors but randomness is also introduced by both the operating system (e.g., port selection, interrupts, task scheduling) and the applications (e.g., adding random fields) that have to be controlled to achieve exact parallel operation. Moreover, the systems require additional mechanism to decide on the correct value when there is a comparison mismatch at the outputs. This support comes from the board (hardware) itself or from software components, those are proprietary extensions that are unknown in detail. To fulfill these requirements special hardware and operating systems are usually needed rendering fault tolerant systems very costly.

EP 1 599 099 A1 describes improvements in message-based communications. Here, a method of communicating information between an intermediate element and a source element in a message-based communication system in which request messages are sent from the source element and in response a corresponding response message is sent from a destination element is provided. An exchange of messages is known as a transaction in SIP, wherein a transaction comprises all messages from the first request message up to a final response message. The proxy is a stateful proxy determining whether the received message is part of the current transacation, e.g. by matching a transaction identifier for the current message with the information stored in a transaction context. Further, another proxy is provided, which is stateless, i.e., it does not maintain a transaction context and thus does not require a context storage means.

U.S. Pat. No. 6,360,270 B1 describes hybrid and prediction admission control stragegies for a server. Here, and admission control system for a server including an admission controller that receives a stream of messages from one or more clients targeted for the server is described. The admission controller relays the messages to the server in a stream that corresponds to a number of sessions underway between the clients and the server. The admission controller processes individual ones of the arriving messages based upon the indications provided by the resource monitor and a determination of whether the arriving messages correspond to session already underway with the server. For example, a transaction list identifies any session.

SUMMARY OF THE INVENTION

It is therefore an object of the invention to provide generally applicable mechanisms for more simply arranging gateways and an improved controlling method for controlling such gateways.

This object is solved by gateway entities having the features of independent claims presented herein.

Further advantageous embodiments of the invention are described in the dependent claims.

According to one embodiment, there is provided a gateway entity for connecting at least one application entity with a communication network and a corresponding control method, said application entity running an application that conforms to rules of a predetermined protocol, where said predetermined protocol provides for transactions consisting of an initial message and at least one response message, a transaction identifier being derivable for each message, and said transaction identifier being different from one transaction to another, said gateway entity comprising: a transaction identifier determinator for determining a transaction identifier from a message received at said gateway entity from said application entity or said network, a memory for holding transaction identifiers, a control logic for comparing said determined transaction identifier with transaction identifiers stored in said memory, and for writing said determined transaction identifier into said memory and processing said message as an initial message if said determined transaction identifier is not present in said memory, and for processing said message as a response message if said determined transaction identifier is present in said memory.

An application entity within the meaning of the present application and claims is any entity that runs an application, such as a server or an application component operating in a redundant system. A transaction identifier can be any suitable or desirable information from which a transaction can be identified. For example, it can be an information that the entity sending an initial message adds to said initial message, and which in accordance with the protocol the receiver of said initial message then also places in the response message.

The gateway entity of the above embodiment can be simple and can process messages of a given protocol without having to be fully aware of the specific details of the protocol. A mechanism is provided for distinguishing initial messages from response messages. The gateway entity is arranged to be able to distinguish transaction identifiers of the protocol, but other protocol awareness is not required. Initial messages (e.g. requests) and response messages can be easily distinguished by simply checking whether a specific transaction identifier of a message is present in a memory, i.e. a message identified by said transaction identifier has previously passed through the gateway entity. Therefore, in order to distinguish initial messages from response messages, the gateway entity does not have to understand the underlying protocol in detail, nor the message structure and content, and only needs to identify a field or fields in the message coding for the transaction identifier.

According to another embodiment, there is provided a gateway entity for connecting at least two application entities with a communication network, and a corresponding control method, said application entities independently running the same application that conforms to rules of a predetermined protocol, where said rules prescribe at least one sequence of messages, said sequence comprising at least two sequence steps, and sequence step information is derivable for each message and different from one sequence step to another but the same for two messages that are generated at the same sequence step in said independently running application entities, said gateway entity comprising: a message handler comprising a receiver for receiving outbound messages from said application entities, a sequence step information determinator for determining sequence step information in an outbound message, a memory for holding sequence step information, and a control logic for comparing said determined sequence step information with sequence step information stored in said memory, and for writing said determined sequence step information into said memory and processing said outbound message as a first message of a given sequence step if said determined sequence step information is not present in said memory, and for processing said outbound message as a further message of said given sequence step if said discriminated sequence step information is present in said memory.

A sequence of messages as mentioned above can e.g. be a particular initial message followed by a predetermined first and second response. Each of these three steps will then have its associated identifier. In practice, a protocol will generally provide for a large number of sequences, depending on specific work cases, but the above mentioned concept only requires the presence of one sequence with corresponding steps and step identifiers.

In a redundant system, in which at least two application entities are operating in quasi-parallel, i.e. working on the same workload but without requiring exact synchronous execution in the entities, the gateway entity will generally receive a message associated with a particular sequence step from each of the application entities. The simply structured gateway of the above embodiment is capable of distinguishing which of these messages of a particular sequence step is the first in time, and which ones are following messages that arrive later. The gateway entity is arranged to be able to distinguish sequence step information of the protocol, but other protocol awareness is not required.

Accordingly, the gateway entity can be of a simple structure resulting in it being less error-prone and can process messages of a protocol without having to be fully aware of the protocol, so that even an unintelligent gateway is able to distinguish between a first outbound message identified by sequence step information from further outbound messages identified by the same sequence step information.

In the first above example, the simple gateway can distinguish between initial messages of a transaction and response messages. In the second above example, the simple gateway can distinguish between a first message of a particular sequence step and following messages of that sequence step. Both examples have in common the concept of identifying a selected information in messages and appropriately managing a memory, in order to provide the distinguishing capability, without having to provide for any further protocol awareness. Each example can be used on its own. For example, in a system, in which application entities only receive requests, there is no necessity or utility in distinguishing between initial messages and responses at the gateway entity, because each inbound message will be a request and each outbound message will be a response. Equally, if there is no redundancy, there is no utility in distinguishing between the first message of a sequence step and following messages. However, if it is suitable or desirable, the above two examples can also be combined to provide both distinguishing capabilities in one gateway entity.

In other words, according to another embodiment, there is provided a gateway entity for connecting at least two application entities with a communication network, and a corresponding control method, said application entities independently running the same application that conforms to rules of a predetermined protocol, where said rules prescribe at least one sequence of messages, said sequence comprising at least two sequence steps, and sequence step information is derivable for each message and different from one sequence step to another but the same for two messages that are generated at the same sequence step in said independently running application entities, and wherein said predetermined protocol further provides for transactions consisting of an initial message and at least one response message, a transaction identifier being derivable for each message, and said transaction identifier being different from one transaction to another, said gateway entity comprising a message handler comprising a receiver for receiving outbound messages from said application entities, a sequence step information determinator for determining sequence step information in an outbound message, a memory for holding sequence step information, and a control logic for comparing said determined sequence step information with sequence step information stored in said memory, and for writing said determined sequence step information into said memory and processing said outbound message as a first message of a given sequence step if said determined sequence step information is not present in said memory, and for processing said outbound message as a further message of said given sequence step if said discriminated sequence step information is present in said memory, as well as a transaction identifier determinator for determining a transaction identifier from a message received at said gateway entity from an application entity or said network, wherein said memory is further adapted to hold transaction identifiers, and said control logic is adapted to compare said determined transaction identifier with transaction identifiers stored in said memory, and to write said determined transaction identifier in said memory and to process said message as an initial message if said determined transaction identifier is not present in said memory, and to process said message as a response message if said determined transaction identifier is present in said memory.

Accordingly, a gateway entity is provided, which may distinguish between a first and a further outbound message and additionally determine whether the first or further outbound message is an initial or response message, by simply comparing sequence step information of an outbound message with previously stored sequence step information and a transaction identifier of a message with a previously stored transaction identifier, without having to be fully aware of the protocol or the message structure and content. Therefore, the inbound and outbound messaging in a complex system may be controlled by an unintelligent gateway, which only has to identify a field or fields coding for sequence step information and a field or fields coding for a transaction identifier. Due to the simple structure of the gateway entity, the possibility of failures is reduced and due to its protocol unspecific structure, the protocols may be changed in time leaving the hardware largely unchanged as the requirements to the system change.

According to the above preferred example, a simple structured gateway entity is provided for minimizing failures that may occur in complex systems so that by means of this gateway standard application entities may be made highly available without support of high availability functions in the application entities and telecom grade operating systems. In other words, a high availability functionality can be provided on the basis of standard application components that themselves have no high availability capability or high availability awareness, and using a gateway entity that comprises a simple control logic.

Therefore, transparent high availability can be achieved for application entities that, for example, work with a class of application layer protocols whose messages carry records related to transaction identifiers and sequence step information due to for example uniqueness and security requirements. The above solution is based on standard application entities that do not have to support high availability functions individually, rendering it possible to leverage on the advantages of open source software, portability, quick migration to new software versions as new releases do not need to be tailored to meet high availability requirements.

BRIEF DESCRIPTION OF THE FIGURES

FIG. 1 illustrates a telecommunication system showing a network, gateway entity and two application entities;

FIG. 2a illustrates in detail a gateway according to one embodiment;

FIG. 2b illustrates in detail a gateway according to another embodiment;

DETAILED DESCRIPTION OF THE EMBODIMENTS

Figure 3:
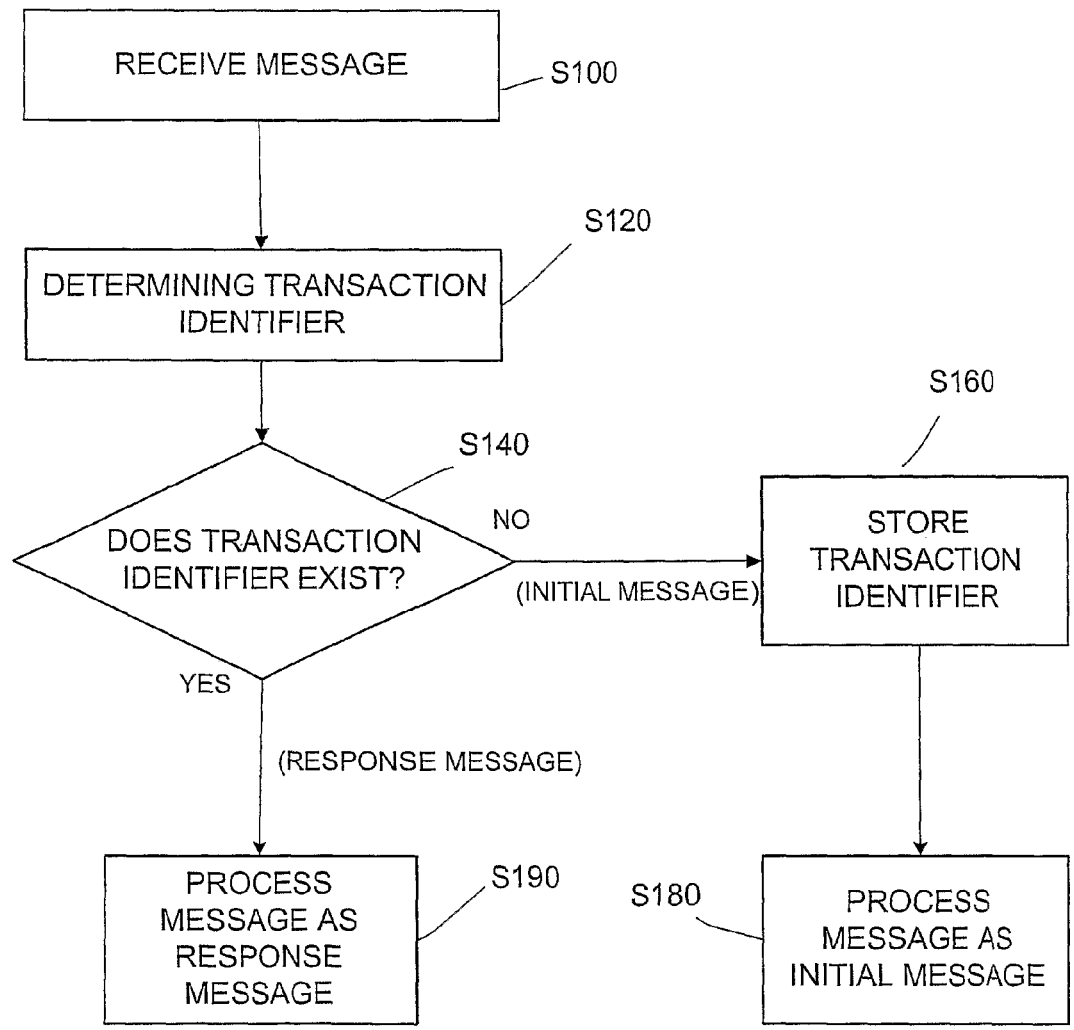
FIG. 3 illustrates a flow chart with basic functions of a gateway entity controlling method according to one embodiment.

In the following an embodiment of the invention will be described with regard to FIG. 1.

FIG. 1 illustrates elements of a telecommunication system, particularly, illustrating a network 100, a gateway entity 200 and application entities 310 and 320.

The network 100 may comprise one or more communication devices, such as servers, routers or edge routers, fixed line or wireless telephones or simple personal computers, or specifically a user agent client and user agent server.

The gateway entity 200 may be connected to the network 100 and the application entities 310, 320 physically by fixed lines or by wireless connections, wherein an entity is a device or plurality of devices for providing a particular functionality.

In this case, the gateway entity provides a gateway functionality by parsing or simply passing through messages from a network to one or more application entities or vice versa. In other words, the gateway entity may be physical unit or can have a distributed character acting as a mediation logic between different devices sending messages.

An application entity, such as the application entities 310, 320, is an entity that runs an application, such as a proxy or a server or an application component or application node. It should be noted that the invention is not limited to two application entities but also one application entity or multiple application entities can be used in some cases, and a telecommunication system with two application entities is presented only for illustrative purposes.

FIG. 2a illustrates the structure of a gateway entity of one embodiment of the present invention.

As illustrated in FIG. 2a the gateway entity 200a may comprise a transaction identifier determinator 220, a memory 230 and a control logic 240.

The transaction identifier determinator 220 determines a transaction identifier from a message received at the gateway entity 200a from an application entity 310, 320 or network 100 connected to the gateway entity 200a. The transaction identifier determinator 220 may be realized in the gateway entity 200a by a separate unit or by means of software implemented on a programmable device, or might be integrated as part of the control logic 240.

The memory 230 can be any suitable or desirable storage device and might be one or a combination of several of the following components, a RAM, a ROM or hard disk an (E)EPROM, a disk, a flash memory or even a register but is not limited to these components. In detail, the memory holds a transaction identifier which could have been previously stored or might be stored after being determined by the transaction identifier determinator 220.

However, it is not necessary that the memory 230 is an integral part of the gateway entity 200a but it may be also a separate unit in communication with the gateway entity 200a.

The control logic 240 may be realized by a microprocessor, computer or integrated circuit but is not limited thereto. For example, the functions of the control logic may be implemented by software or hardware and therefore its functions might be changed or extended by software update or hardware configuration. The functioning of the control logic will be described in more detail below.

In particular, the above described gateway entity 200a may be adapted to perform the following steps shown in FIG. 3.

FIG. 3 depicts a method for controlling a gateway entity, such as the gateway entity 200a described above, wherein the gateway entity 200a is connected to at least one application entity 310 and a network 100, and the application entity 310 runs an application that conforms to rules of a predetermined protocol.

The protocol constitutes a convention for controlling or enabling a connection, communication and/or data transfer between two nodes. Multiple different protocols may be used, and an example using the Session Initiation Protocol (SIP) will be discussed later with respect to FIGS. 9 and 10.

In this case, the predetermined protocol provides for transactions consisting of an initial message (e.g. a request) and at least one response message in response to the initial message, wherein the initial message might be transmitted from an application entity or some element of a network, and as a response to the initial message received by an element of the network or an application entity, respectively, the element of the network or the application entity, respectively, can transmit a response message.

A message may contain several fields carrying payload or signaling information. In particular, one or more fields may contain one or more individual records of the message, e.g. indicating the origin or destination of the message. A transaction identifier may be derived for each message and identifies the transaction, in which the message is taking part. For example, a transaction identifier may be related to one or several specific fields of the message. Since there is an individual transaction identifier for each transaction, the transaction identifier differs from one transaction to another and, for example, may constitute a unique number.

Once a message is received at the gateway entity 200a from the application entity or the network in step S100, a transaction identifier is determined from the message in step S120. Thereby, it is not necessary to fully interpret the message but, for example, the transaction identifier determinator 220 has to simply identify a field of the message, from which to derive the transaction identifier. In a very simple case the transaction identifier itself may be carried in the message, which furthermore simplifies the determination of the transaction identifier of the message received at said gateway entity. However, the transaction identifier may also be determined by processing information contained in the message.

After determination of the transaction identifier the transaction identifier is compared in step S140 with transaction identifiers stored in a memory, such as the memory 230. This comparison is performed in the control logic 240 and if said determined transaction identifier is not present in the memory 230, it is written into, said memory in step S160, and the message is processed in step S180 as an initial message.

Further, in case the determined transaction identifier is present in the memory 230 the message is processed as a response message in step S190, which indicates that previously a message has passed through the gateway, which contains a field (or fields), from which the same transaction identifier can be derived, so that this constitutes a message of the same transaction.

Figure 8:
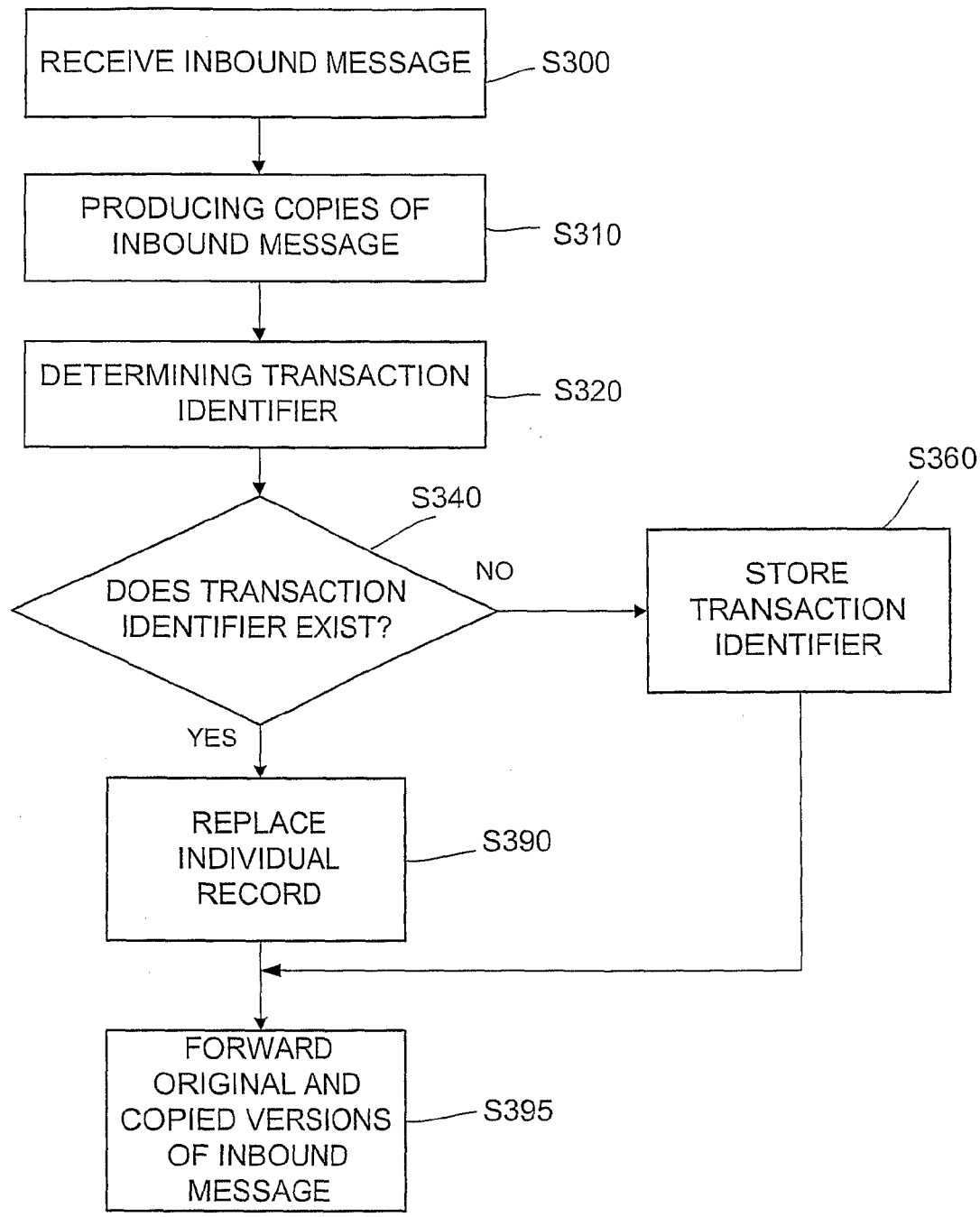
FIG. 8 illustrates a flow chart of a gateway entity controlling method according to another embodiment.

Specifically, the processing in steps S180 and S190 might include steps such as forwarding the message, similar as shown in FIG. 8 discussed later.

A more concrete example of the above-explained process is described below.

Assuming a message is transmitted from an element of the network to the gateway entity 200, then the transaction identifier associated with the message is determined and if the transaction identifier does not already exist in the memory 230, it is stored therein indicating that the message is an initial message constituting a request.

Then, the request (initial message) is forwarded to one or more application entities, and a message answering the request is sent back from the application entity or entities to the gateway entity 200 as a response message leaving the transaction identifier unchanged, since it relates to the same transaction. Since the transaction identifier is left unchanged, it has been previously stored in the memory so that the gateway entity realizes that this message is a response to the previous request.

Therefore, an initial message and a response message can be easily distinguished by simply comparing their transaction identifiers with previously stored transaction identifiers, and no further intelligence is needed in the process.

In the following, another embodiment of the invention will be described with regard to FIG. 2b.

FIG. 2b illustrates a gateway entity of another embodiment in more detail.

The gateway entity 200b of FIG. 2b comprises a message handler 210, which contains a receiver 250, a sequence step information determinator 260, a memory 270, and a control logic 280.

The gateway entity 200b can be incorporated in a telecommunication system, such as the one shown in FIG. 1, wherein the application entities 310 and 320 independently run the same application that conforms to rules of a predetermined protocol. The rules prescribe at least one sequence of messages, and the sequence comprises at least two sequence steps, wherein sequence step information is derivable for each message and different from one sequence step to another but the same for two messages that are generated at the same sequence step in said independently running application entities.

The receiver 250 of the gateway entity 200b receives outbound messages from the application entities 310, 320.

The sequence step information determinator 260 may be realized in the gateway entity 200b by a separate unit or by means of software implemented on a programmable device or might be even integrated as part of the control logic 280.

The sequence step information determinator 260 is shown in FIG. 2b as being a part of the gateway entity. However, it is also feasible to use a sequence step information determinator which is an external part in communication with the gateway entity 200b.

In detail, the sequence step information determinator 260 determines sequence step information in an outbound message. Thereby, the sequence step information determinator 260 identifies a specific field or fields in the received outbound message, from which sequence step information may be derived. Messages having the same sequence step result from application entities running the same application. In general, a protocol will describe a great number of such sequences, but for describing the invention only one is described.

The memory 270 shown in FIG. 2b might be one or a combination of several of the following components, a RAM, a ROM or hard disk, an (E)EPROM, a disk, a flash memory or a register but is not limited to these components. The memory 270 holds sequence step information, which can be stored in advance or at a later stage, which is described below.

Further, it is not necessary that the memory 270 is an integral part of the gateway entity 200b but it may be also a separate unit in communication with the gateway entity 200b.

The control logic 280, for example, may be realized by a microprocessor, computer or integrated circuit but is not limited thereto. The control logic can perform several functions, which may be implemented in software running on a microprocessor, computer or integrated circuit or in hardware.

One function of the control logic 280 is to compare sequence step information determined by the sequence step information determinator 260 with sequence step information stored in the memory 270. The control logic 280 can write the determined sequence step information into the memory 270 and processes the outbound message as a first message of a given sequence step, if said determined sequence step information is not present in the memory 270. Otherwise, the control logic 280 may process the outbound message as a further message.

Figure 4:
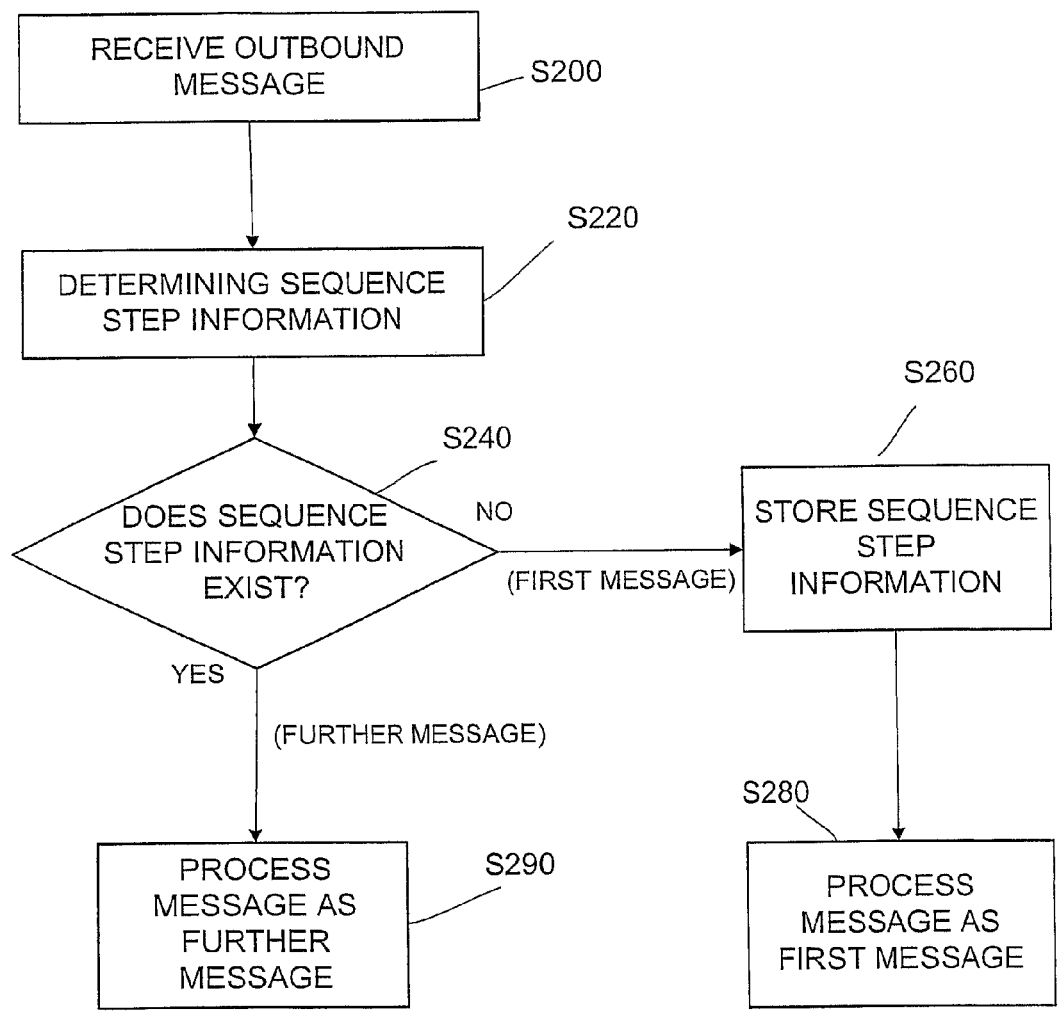
FIG. 4 illustrates a flow chart with basic functions of another gateway entity controlling method according to another embodiment.

In particular, the above described gateway entity 200b may be adapted to perform the following steps shown in FIG. 4.

In FIG. 4, step S200 indicates that an outbound message is received by the gateway entity 200b, for example. Here, an outbound message is defined as a message that comes from one of the application entities 310 or 320. In contrast thereto, an inbound message is defined as a message that comes from an external location, such as an element in the network 100.

In step S220 sequence step information derivable for the received outbound message is determined. For example, the structure of an outbound message can be such that the outbound message contains several fields including payload and signaling information. Such a field or fields may also contain records or stochastic records, which are related to or code for sequence step information. Therefore, by simply identifying a required field which codes for sequence step information this information can be determined from the message without further having to interpret the whole message.

The sequence step information may generally have any suitable or desirable form for identifying a sequence step of a sequence being conducted in parallel or quasi-parallel or redundant application entities, and could e.g. also be a unique identifier, such as a number that counts the sequence steps. For example, the sequence step information can consist of two parts, one for identifying a given sequence, and one for identifying the step within the given sequence.

In step S240, it is checked whether this specific sequence step information already exists, i.e. whether an outbound message with the same sequence step information has already passed through the gateway entity 200b. To achieve this, the determined sequence step information is compared with sequence step information previously stored in the memory 270.

In case, it is found that the determined sequence step information is not present in the memory 270, the determined sequence step information is written in the memory in step S260 and the outbound message is processed as a first message in step S280. Otherwise, if it is found that said determined sequence step information is present in the memory 270, the outbound message is processed as a further message in step S290.

Therefore, it is possible to distinguish between a first and a further outbound message by simply determining the sequence step information of the outbound message and comparing it to previously stored sequence step information. Consequently, redundant messages coming from different application entities 310, 320 but containing the same sequence step information, since they relate to the same sequence step, can be distinguished from a first outbound message.

Furthermore, it has to be noted that the process discussed in FIG. 3 is equally applicable for inbound and outbound messages and the process of FIG. 4 does not necessarily need to consider initial and response messages, since there are cases where this is not suitable or desirable, e.g. when requests do not have to be generated by application entities, if one e.g. imagines a very simple system, in which the application entities only receive requests.

It is then not necessary to distinguish between requests and responses at the gateway, because each inbound message will be a request and each outbound message will be a response.

As can be seen from FIGS. 3 and 4, it is possible to distinguish between different kinds of messages by simply determining a transaction identifier or sequence step information and comparing it with previously stored ones. Therefore, no further intelligence has to be added to a gateway entity 200a, 200b except for determining such a specific marker and comparing it with previously stored ones.

Therefore, both embodiments describe simplified gateways that can perform specific operations with respect to messages of a given protocol, without however having to be fully aware of said protocol. For example, if the protocol version changes, the logic might not be affected as long as the fields/records do not change.

In the following, a combination of the previously described embodiments will be described with respect to FIGS. 5 and 6.

Figure 5:
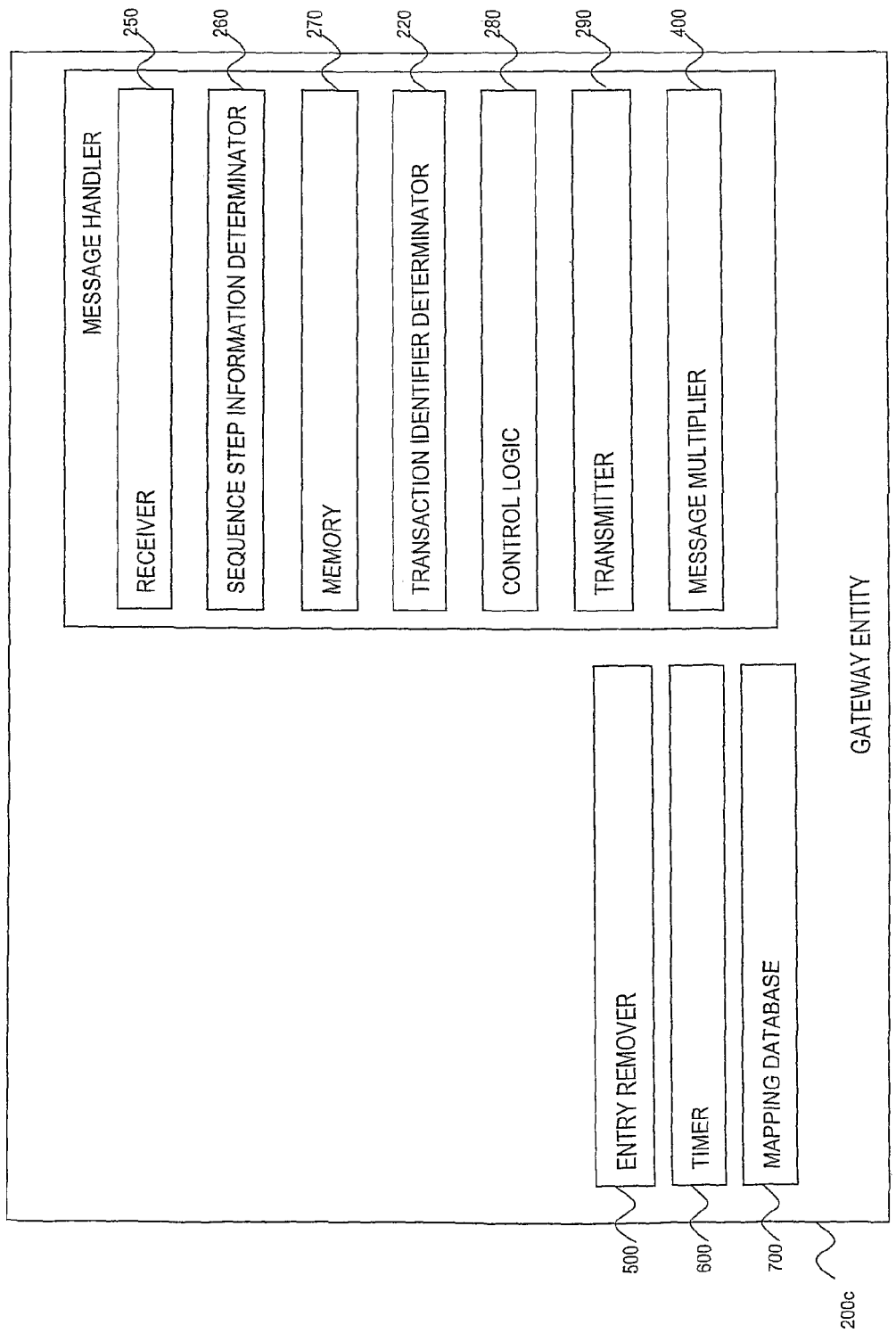
FIG. 5 illustrates in detail a gateway according to another embodiment.

The gateway entity 200c shown in FIG. 5 comprises similar components as the gateway entities 200a, 200b shown in FIGS. 2a and 2b. In particular, the message handler 210 comprises a receiver 250, a sequence step information determinator 260, a memory 270 and a control logic 280 as well as preferably a transaction identifier determinator 220 and transmitter 290.

In a further preferred embodiment, the message handler may also comprise a message multiplier 400. Additionally or alternatively, the gateway entity may also preferably comprise an entry remover 500, a timer 600 and a mapping database 700 and alternatively these components may be external devices in communication with the gateway entity.

In the following, the components of this gateway entity will be described in more detail, whereby a detailed description of the components already described in the previous embodiments will be omitted.

The receiver 250 of the gateway entity 200c receives outbound messages from the application entities 310, 320 and preferably may also be adapted to receive inbound messages from the network, and in particular from specific network elements.

Further, the sequence step information determinator 260 determines sequence step information in an outbound message as described above in the previous embodiment.

The memory 270 and the control logic 280 have been described in detail in the previous embodiment, so that a detailed description of these components is omitted.

Preferably, the gateway entity with the receiver 250, the sequence step information determinator 260, the memory 270 and the control logic 280 may also comprise a transaction identifier determinator 220.

This transaction identifier determinator 220 may be realized in the gateway entity 200c by a separate unit or by means of software implemented on a programmable device or might be integrated as part of the control logic 280 and is used for determining a transaction identifier from a message received at said gateway entity from an application entity or a network 100 as shown in FIG. 5.

This enables the gateway entity 200c to not only distinguish between a first and a further outbound message but also handle a plurality of transactions, so that it can be determined which first or further outbound message belongs to which transaction. Additionally, inbound messages may also be checked for their transaction identifier to distinguish between different transactions of different inbound messages.

In a further preferred embodiment the memory 270 is also adapted to hold transaction identifiers. Alternatively, transaction identifiers can be stored in a physically separated different memory, so that the transaction identifiers and the sequence step information is stored in different physical parts.

Furthermore, the control logic 280 is preferably further adapted to compare the determined transaction identifiers with transaction identifiers stored in the memory 270 and to write the determined transaction identifier in the memory and process the message as an initial message if said determined transaction identifier is not present in the memory, and to process the message as a response message if said determined transaction identifier is present in the memory.

Therefore, outbound messages cannot only be distinguished between a first outbound message and further outbound messages but also whether the first or further outbound message is an initial or response message and grouping of these messages is performed simply by determining a transaction identifier and sequence step information and checking whether this transaction identifier and sequence step information has been already stored in a memory. Also, inbound messages can be distinguished between initial or response inbound messages.

Alternatively, the above-described function of the control logic 280 of comparing the determined transaction identifiers with transaction identifiers stored in the memory 270 may be provided in a separate unit independent of the control logic 280 but in communication therewith.

Additionally, the gateway entity 200c may also contain a transmitter 290 for transmitting outbound messages to the network 100 or transmitting inbound messages to one or multiple application entities 310, 320. Preferably, a first outbound message is transmitted to the network 100, whereas further outbound messages are not transmitted but discarded.

It is further advantageous to include an inbound message multiplier 400 in the gateway entity 200c to receive at least an inbound message from the network 100 and produce copied versions of said inbound message, wherein the original inbound message is forwarded to one application entity, e.g. application entity 310, and each copied version of said inbound message is forwarded to each one of the other application entities, e.g. application entity 320. This allows the quasi-parallel operation of the application entities, such that each one can keep state.

Preferably, the number of versions including the original inbound message and copied versions is equal to the number of application entities so that each application entity may be provided with one version of an inbound message. However, it is also feasible to provide several inbound messages to one application entity.

Furthermore, the gateway entity 200c may preferably contain an entry remover 500 and a timer 600 for removing an entry from the memory 270 after a certain time has elapsed. It should be noted, that also several entry removers and timers might be provided in case not only one but several memories for different parameters are used.

As discussed above, a transaction identifier and sequence step information are stored in the memory 270 and are preferably unique. Nonetheless, they do not have to be unique. However, for maintenance of the memory and especially to be able to use the values for a transaction identifier or sequence step information for a different transaction or sequence in the future, the memory can be cleaned up using the entry remover 500 after a certain time periods indicated by the timer 600. Therefore, transaction identifiers and sequence step information do not have to be unique and the memory is purged from time to time.

The purge mechanism should use time periods significantly larger than any of the service times, i.e. time periods that are longer than the expected lifetime of a transaction or sequence. For example the entry or entries are removed from the memory 270 after roughly two times the time needed for a transaction or a sequence, wherein the time for a transaction is at least the time needed for one request and one response.

The time length for a sequence is dependent on the specific sequence but at least the length of two sequence steps.

In the above examples, it was assumed that the messages being sent by the different application entities did not contain individual records that vary from a message of a given sequence step of a first application entity to a message of the same sequence step of a second, different application entity. If individual information is present, e.g. due to the structure of the underlying protocol, it is preferable to include a mapping database in the gateway entity 200c for storing individual records of a message identified by a transaction identifier. An individual record can be located in a field of a message and will be described below in the context of creating a mapping database to be used with the gateway entity and shown in FIG. 7.

Figure 6:
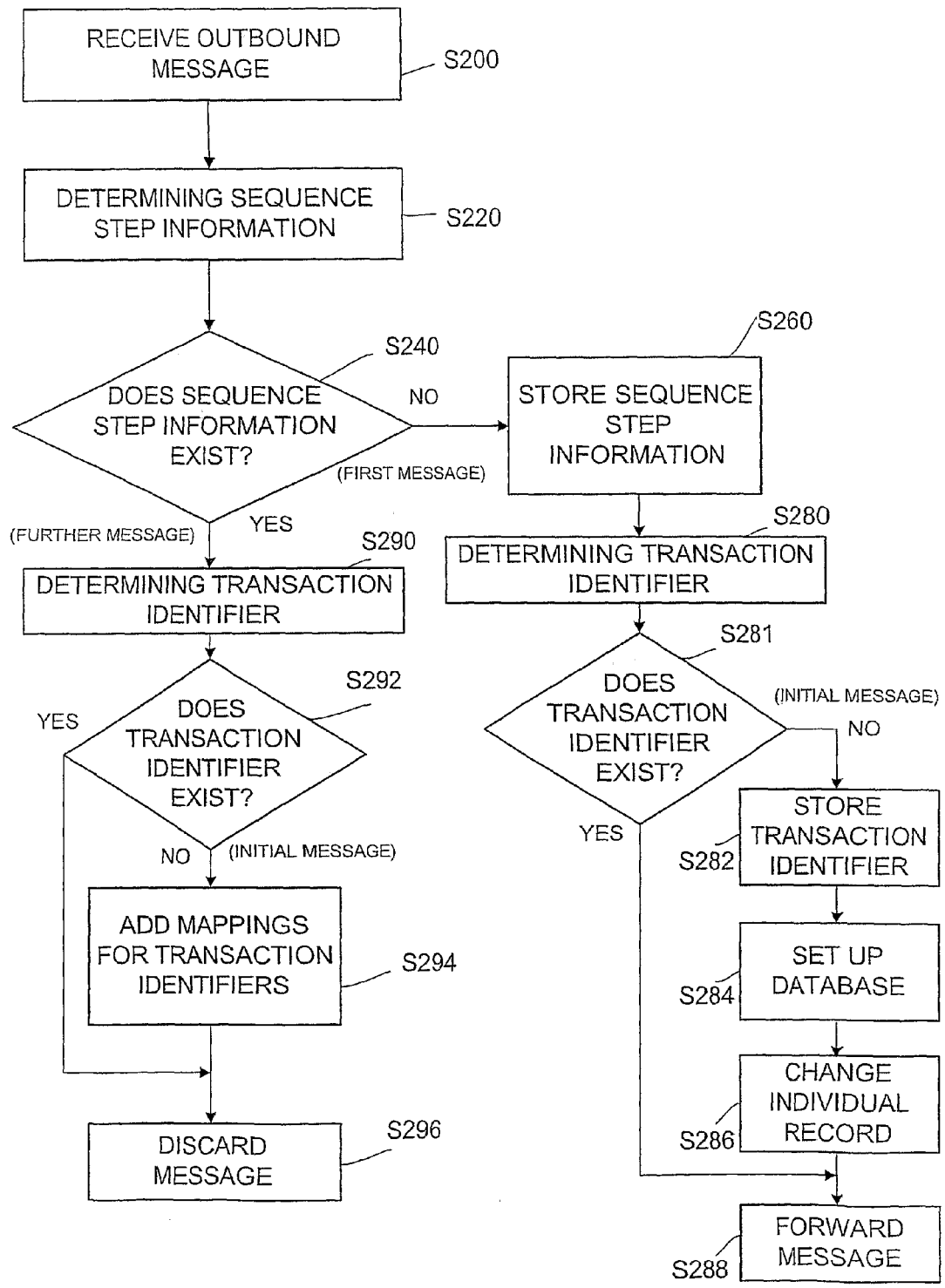
FIG. 6 illustrates a flow chart relating to a gateway entity controlling method according to another embodiment.

In particular, the above described gateway entity 200c may be adapted to perform the following steps shown in FIG. 6.

In the following embodiment, the gateway entity 200c is connected to at least two application entities 310, 320 and a communication network 100, as described above, wherein the application entities independently run the same application that conforms to rules of a predetermined protocol.

Steps S200, S220, S240 and S260 can be identical to the previously discussed steps with the same reference sign and will be discussed only briefly.

In step S200 an outbound message is received by the gateway entity 200c and in step S220 the sequence step information of the outbound message is determined. Then, in step S240 the determined sequence step information is compared with sequence step information stored in a memory, such as the memory 270, and the determined sequence step information is written into the memory in step S260 and the outbound message is processed as a first message in step S280 if said determined sequence step information is not present in the memory. Otherwise, if the determined sequence step information is present in the memory the outbound message is processed as a further message, step S290.

As shown in FIG. 6, the processing of the outbound message as a first message, step S280, may comprise determining a transaction identifier, wherein one or more fields in the outbound message has to be identified, which codes for the transaction identifier.

In detail, a transaction identifier may be obtained from one or more individual records, wherein at least one particular individual record is different from one application entity to another for messages with the same sequence step information, and which is contained in an initial and response message of the same transaction, so that an application entity expects to obtain a response inbound message to an initial outbound message sent by the given application entity to have the same transaction identifier.

Then, in step S281, the determined transaction identifier of the first outbound message is compared with the transaction identifiers stored in the memory, and the determined transaction identifier is written in the memory in step S282, and the first outbound message is processed as an initial message, if the determined transaction identifier is not present in the memory. Otherwise, if the determined transaction identifier is present in the memory, the first outbound message is forwarded as a response message to the network, as shown in step S288.

In step S284, preferably the determined transaction identifier of said first outbound message processed as an initial message and at least one individual record contained in the first outbound message are added to a database 700. Thereby, a primary role is assigned to the application entity sending said first outbound message. In the example shown in FIG. 7, this is the application entity 310 and other application entities take the role of a backup regarding this sequence step.

In detail, the mapping database comprises a column 710 for different transaction identifiers, and several columns 720, 730 and 740 corresponding to the number of application entities connected to the gateway entity 200c. The entry of step S284 is shown in line 760, which constitutes the first entry with the first transaction identifier TI1 and the corresponding individual record ind.record(TI1).

Preferably, in step S286, a translation of the individual record ind.record(TI1) may be performed to change the record in the corresponding field of this outbound message for e.g., topology hiding, so that a network element receiving the outbound message does not recognize that the outbound message has been sent from application entity 310. The predetermined replacement individual record may, for example, indicate that the outbound message simply comes from the gateway entity.

However, this predetermined individual record has to be stored again in a database of possibly multiple databases so that a subsequent inbound message with the same predetermined individual record can be directed to the right application entities.

The first mapping constituting the transaction identifier TI1 and individual record ind.record(TI1) are added to the first position of the database. The additional mappings in the mapping database result from further outbound messages constituting further requests, wherein these outbound messages have the same sequence step information as the determined sequence step information in step S220 and will be discussed in detail below.

Finally, in step S288, the first outbound message is forwarded to the network either with the individual record ind.record(TI1) or with the predetermined individual record.

In case the gateway entity 200c receives another outbound message, and it is determined that the sequence step information is the same as the sequence step information of the previously received message, namely the first outbound message, this outbound message will be processed as a further outbound message, and in step S290 the processing of said outbound message as a further message comprises determining its transaction identifier.

In step S292 the determined transaction identifier of the further outbound message is compared with the transaction identifier stored in the memory 270 and if said determined transaction identifier is not present in the memory, the further outbound message is processed as an initial further outbound message, otherwise if the determined transaction identifier is present in the memory the further outbound message is discarded. Namely, as a message of this sequence step has already been sent out to the network, the further message should be dropped.

In step S294, the further processing of the further outbound message is shown. This step comprises adding to the mapping database 700 the determined transaction identifier of said further outbound message (TI2) to column 710 and an individual record (ind.record(TI2)) contained in the further outbound message to column 730. This individual record ind.record(TI2) is, for example, particular for the application entity 320 sending the further outbound message.

Additionally, as shown in line 770 corresponding to the entries for the further outbound message, the individual record ind.record(TI1) is added to column 720 so that the individual record of the first outbound message is mapped to the individual record of the further outbound message.

A similar process is performed for additional further outbound messages from other application entities indicated by N in line 780 and column 740 of the mapping database 700. Therefore, the mapping database maps the individual records of initial further outbound messages identified by their determined transaction identifier to the individual record of the first outbound message, and thus can translate individual records, which will be described in detail below.

Finally, in step S296 the further outbound messages are discarded without reaching any network element.

In the following, the flow chart shown in FIG. 8 is described in more detail. An embodiment is described that relates to receiving inbound messages, i.e. directed from the network towards the application entities, and where the database for individual records is made use of.

In step S300 an inbound message is received by the gateway entity 200c from the network 100. Then, in step S310 copied versions of said inbound message are produced, for example by the message multiplier 400, and in step S320 the transaction identifier of each message is determined in a way as described above.

In the next step S340, the determined transaction identifier is compared with transaction identifiers stored in a memory, such as the memory 270, and if said determined transaction identifier is not present in the memory, the transaction identifier of said inbound message is stored into the memory in step S360 and the inbound message is processed as initial inbound message. Otherwise, if the determined transaction identifier is present in the memory, the inbound message is processed as a response inbound message in step S390, which will be described in more detail.

In step S390, response inbound messages are processed, which are responses to initial outbound messages. In more detail, for one initial outbound message, there are actually multiple inbound messages, namely the original response inbound message and multiple copied versions thereof, as described in step S310.

However, since all copied versions are versions of the same inbound message, they contain the same content in the field or fields indicating the transaction identifier. Thereby, they may all contain the same individual record.

Therefore, in the example of the mapping database 700, all response inbound messages contain the individual record ind.record(TI1).

Assuming that the individual record stands for an address of an application entity, to which the response inbound message has to be sent, all copied versions would be sent to the same application entity. Therefore, since an application entity that previously sent out an initial further outbound message is now also waiting for a response, the field with this individual record of the copied version has to be changed, so that each application entity, which previously sent out an initial further outbound message, may also receive a response inbound message.

Because it has been previously recorded in the mapping database 700, which application entity has sent out an initial outbound message, it is now possible by referring back to the entries of the mapping database to assign different individual records to the copied versions of the response inbound message.

In case of the original response inbound message, it can be referred to line 760 of the mapping database 700, which indicates that the incoming individual record is left unchanged, since this is the individual record of the application entity, for example application entity 310, which sent out the first initial outbound message, thereby obtaining a primary role.

Subsequently, the first copied version of the response inbound message is processed and its individual record is mapped to the individual record ind.record(TI2) indicating that this message has to be sent to application entity 320 (see line 770). The mapping process is performed for the further copied versions of the response inbound message for one inbound message after the other (see line 780).

Therefore, all application entities previously sending an initial further outbound message, which has been discarded, receive a response inbound message due to the mapping in the mapping database 700.

Figure 7:
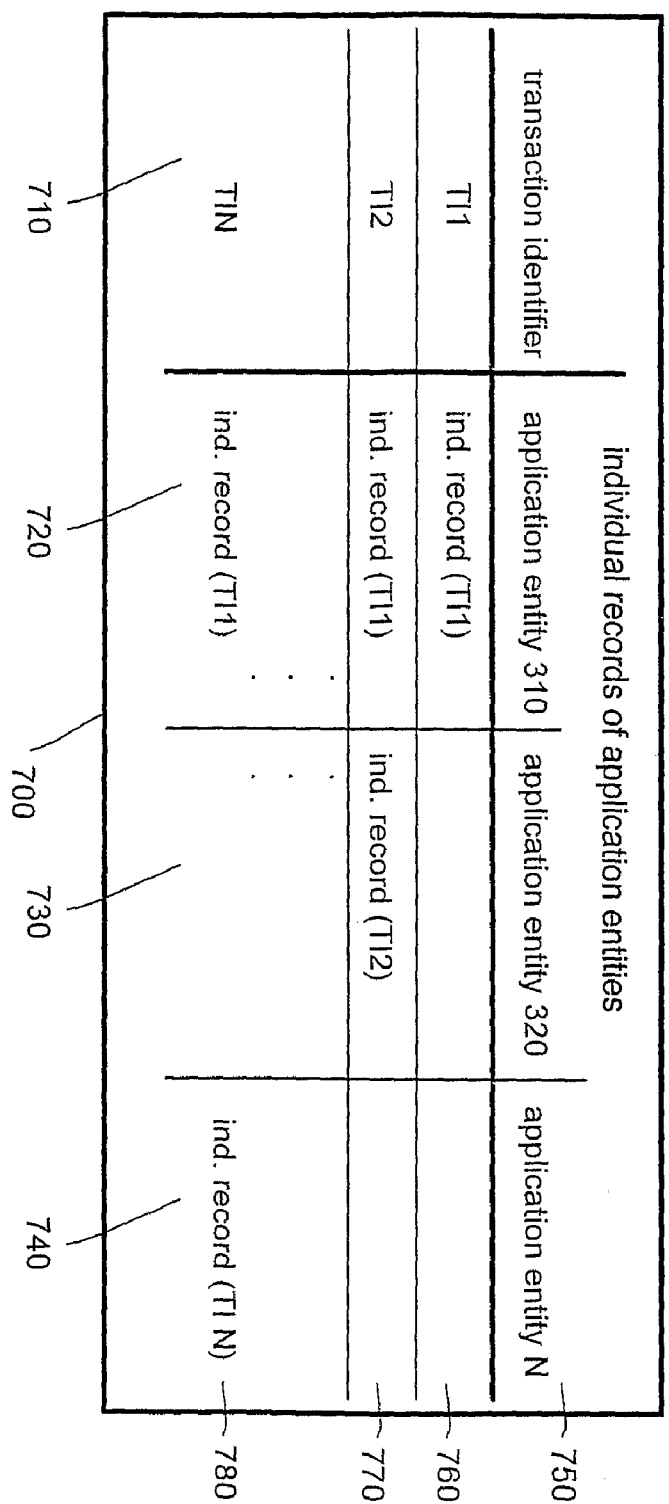
FIG. 7 illustrates an example of a mapping database used by the gateway entity.

It should be noted that the mapping database 700 is not limited to the structure shown in FIG. 7. It can be chosen in any suitable or desirable way, and can have a simpler structure.

From the above explanation of the creation and the mapping performed in the mapping database, it should be clear that it is not necessary to store the transaction identifier but it should be enough to store the individual record alone. This is because the mapping database is created by subsequently adding the individual record in the order, in which the further outbound messages are received.

Therefore, in step S390 the individual records ind.record (TI1) of the original and copied versions of the response inbound message can be replaced in the order they are processed at the mapping database with the individual records ind.record(TI1), ind.record(TI2) . . . ind.record (TIn), which are stored in the order they are received in the mapping database.

Subsequently, after the individual records have been replaced, the original and copied versions of the inbound message are forwarded to the respective application entities in step S395.

The entry remover 500 and timer 600 previously described to remove an entry from a memory storing transaction identifiers and/or sequence step information can also be used to purge the mapping database 700, since after a transaction has finished, it may not be necessary to keep the entries in the mapping database any longer.

A transaction identifier may for example be a hash value calculated from at least one individual record of the message or a function of at least one individual record of a message and sequence step information may for example be a function of at least another individual record of a message.

The above concepts and embodiments can be applied to any protocol that provides for data that can be used for determining a transaction identifier and/or a sequence step identifier. Specific examples of individual records and how they relate to transaction identifiers and sequence step information will be given below with respect to the example of the session initiation protocol (SIP).

As described above, a primary role can be assigned dynamically to an application entity based on sequence step information and a transaction identifier, which eliminates the need for waiting for a statically assigned or predefined and sometimes slower primary application entity. Further, the transaction identifier and sequence step information can be purged from the system depending on the protocol.

In the above described embodiment, even if the primary application entity fails, the gateway entity still may forward one of the outbound messages from the other (backup) application entities due to the redundancy in having multiple application entities performing the same sequence steps.

All the translations applied in the mapping database to the response inbound message should be maintained for the same sequence step information and only new sequence step information should be assigned to a new primary application entity.

It should be noted that the gateway entity may use application states of the backup application entities in an implicit way to reproduce primary application states when that application entity fails.

If more than one application entity including the primary one fail, the original primary state should be used and recovery may be performed by continuously probing all the application entities for possible service, but already ongoing services should be finished with the least number of application entities.

In the following a specific example of the above-described embodiments is shown with respect to FIGS. 9 and 10 using the session initiation protocol (SIP).

Figure 9:
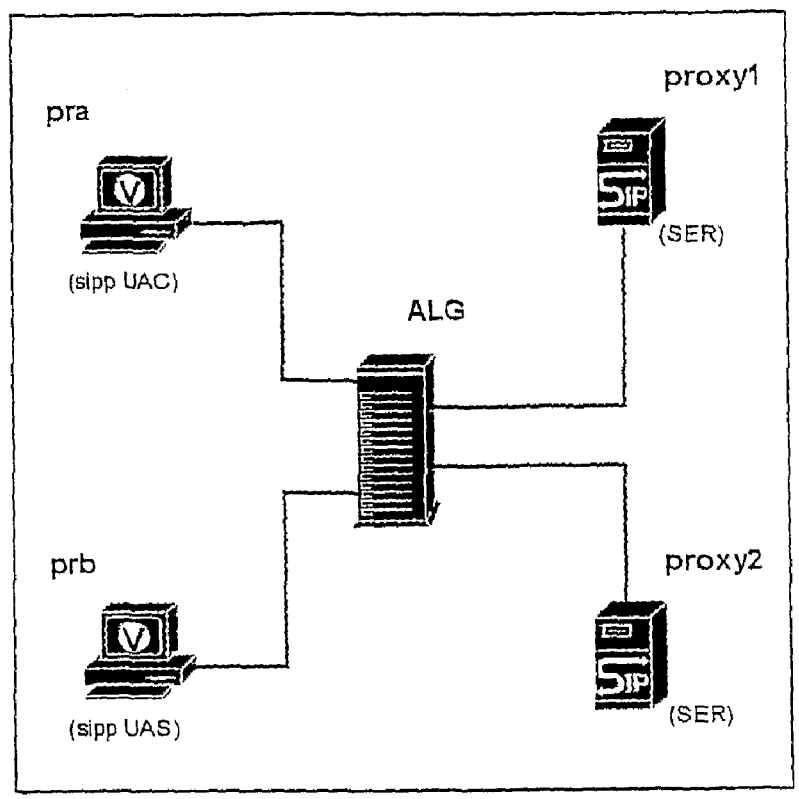
FIG. 9 illustrates an example of a telecommunication system using the gateway entities according to the embodiments.

In this example two open source proxy servers (SIP Express Router, SER) are used as application entities operating in a primary-backup relationship, as shown in FIG. 9. These proxies 1 and 2 are connected to the gateway ALG, which is connected to pra and prb, for example a user agent client and user agent server, respectively.

Examples of individual records of SIP to which translation may be applied, may be the sent-by-value and branch parameter.

A transaction identifier may be obtained from a call-ID and a topmost branch parameter, and the sequence step information may be obtained from the request/status line, the from-field, to-field and CSeq. Grouping of outbound messages might be done by calculating a hash value based on the request/status line, to-field, from-field and CSeq-field.

Figure 10A:
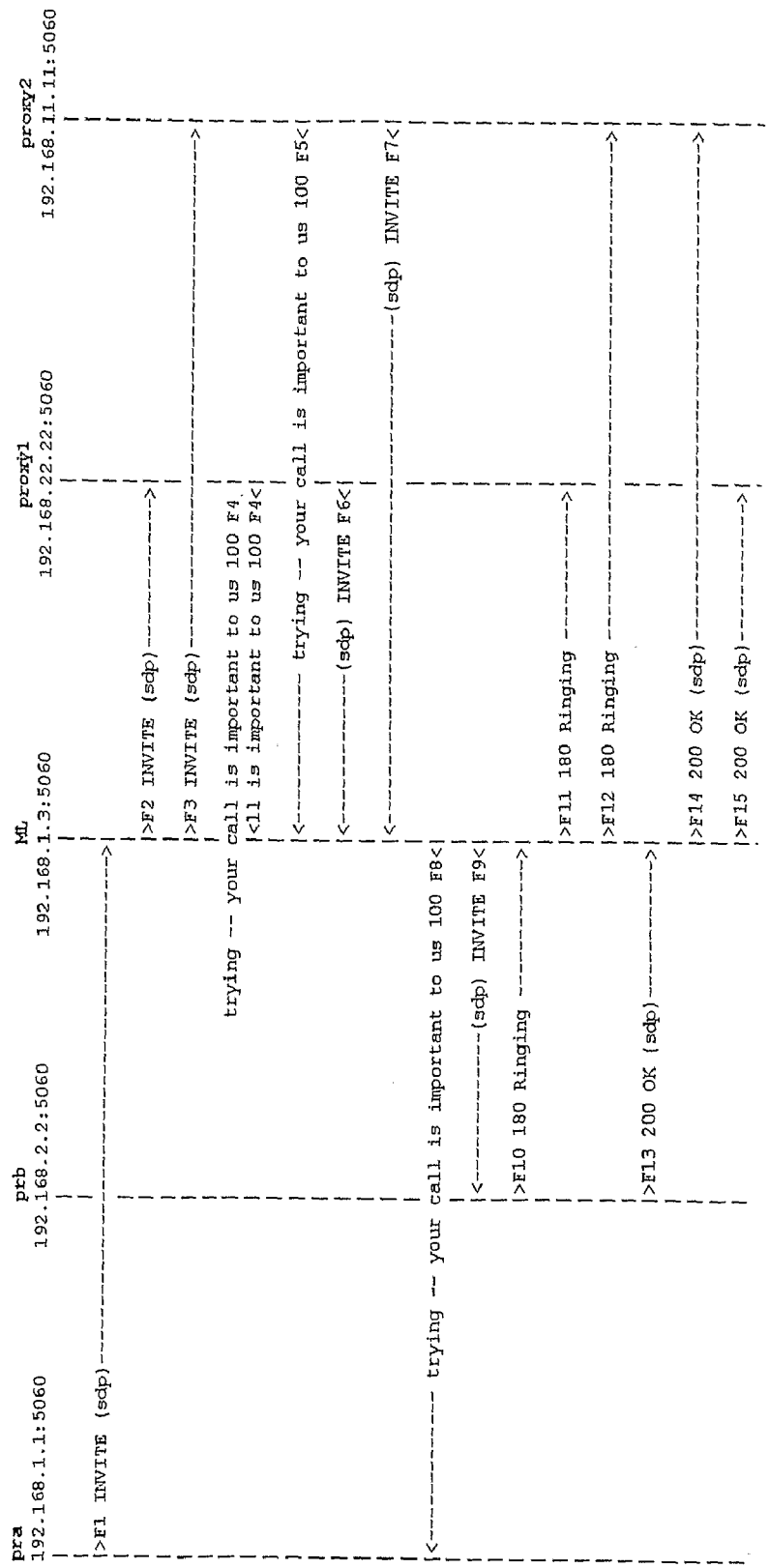
FIG. 10 illustrates an example for call setup and teardown using a session initiation protocol.
Figure 10B:
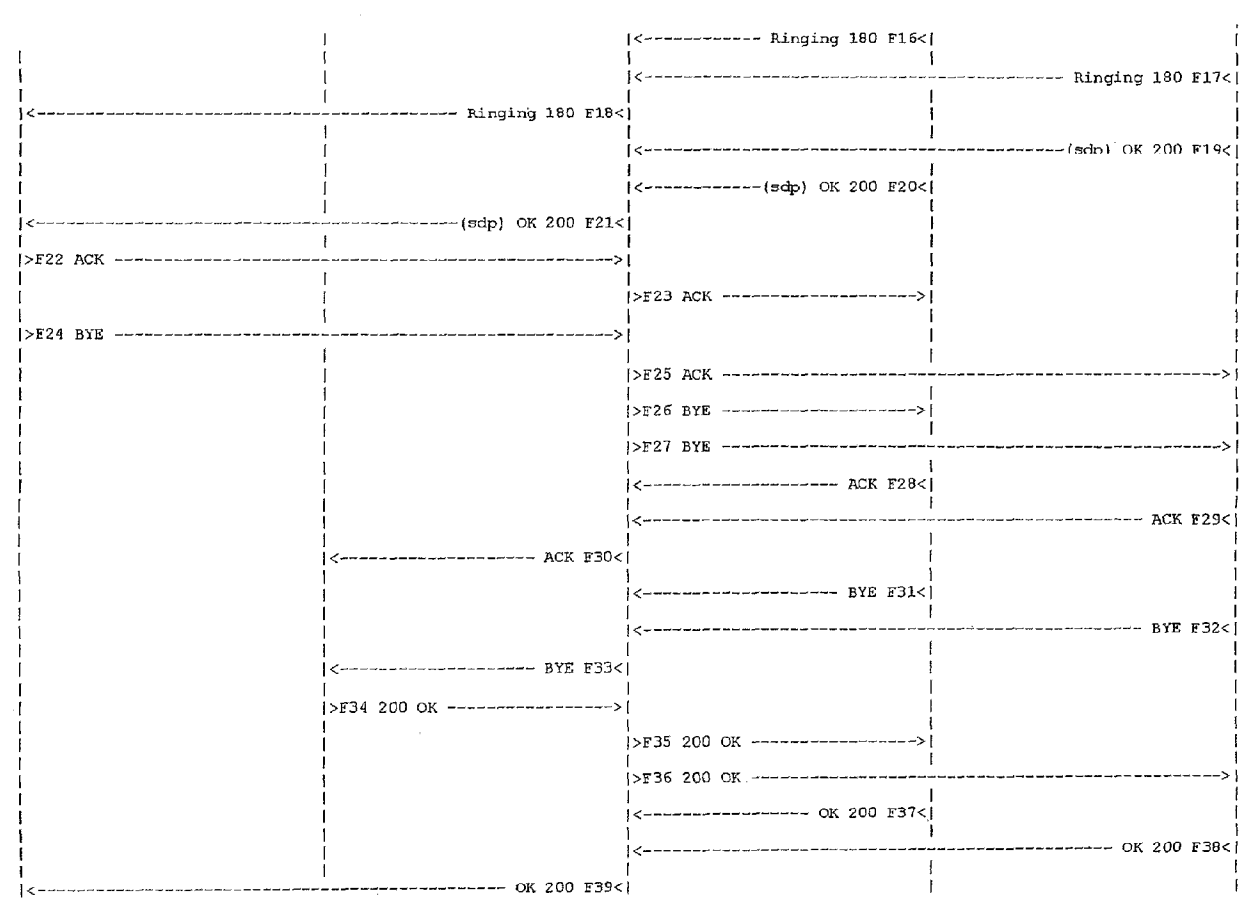

In FIG. 10 a call setup and teardown with zero holding time using SIP is shown for the arrangement shown in FIG. 9.

The pra, which is a user agent client sends in step F1 an INVITE message to the gateway ML. In step F2 the gateway sends an INVITE message to proxy 1 and in step F3 an INVITE message to proxy2.

In step F4, a TRYING message is sent to the gateway from proxy 1 and in step F5 a TRYING message is sent from proxy 2.

Then, in step F6 an INVITE message is sent from proxy 1 and in step F7 an INVITE message is sent from proxy 2 to the gateway, and the gateway entity sends in step F8 a TRYING message to the pra.

In step F9, the gateway entity sends an INVITE message to the prb, which may be a user agent server and in step F10 the prb sends a RINGING message to the gateway entity. In step F11 the gateway sends a RINGING message to the proxy 1 and in step F12 to proxy 2.

In step F13 an OK message is sent from the prb to the gateway, and the gateway sends in step F14 and step F15 an OK message to proxy 2 and proxy 1, respectively. Further, in step F16 the proxy 1 sends a RINGING message to the gateway, and in step F17 the proxy 2 sends a RINGING message to the gateway, which sends a RINGING message to the pra in step F18.

In step F19 and F20, the proxy 2 and proxy 1 send a OK message to the gateway, respectively, which sends an OK message to the pra in step F21.

The pra sends an ACK message to the gateway in step F22, and in step F23 the gateway sends an ACK message to the proxy 1. In step F24 the pra sends a BYE message to the gateway, and the gateway sends an ACK message to the proxy 2 in step F25 and a BYE message to the proxy 1 in step F26 and a BYE message to the proxy 2 in step F27.

In step F28 the proxy 1 sends an ACK message to the gateway and in step F29 the proxy 2 sends an ACK message to the gateway, which sends an ACK message to the prb in step F30.

In step F31 the proxy 1 sends a BYE message to the gateway, and the proxy 2 sends a BYE message to the gateway in step F32. The gateway sends a BYE message to the prb in step F33, and the prb sends an OK message to the gateway in step F34. The gateway sends an OK message in step F35 to the proxy 1 and in step F36 to the proxy 2.

Then, in step F37, the proxy 1 sends an OK message to the gateway, and the proxy 2 sends an OK message in step F38 to the gateway. Finally, the gateway sends an OK message to the pra in step F39.

According to the present invention, the service offered by an application entity can be continuously and smoothly maintained as long as there is at least one serving application entity at a time. Failover is practically done without any delay and together with recovery procedures do not cause interruptions offering service retainabilty in the system.

Further, clients are not aware of the failover and their participation is not required. Usually, client based high availability solutions require clients to reconnect during failover process, which results in service interruption.

Another advantage of the gateway entity discussed above is that it can be used with standard applications and operating systems that do not support high availability functions. Therefore, the possibility is given to leverage on the advantages of open source software, portability, and quick migration to new software versions to meet high availability requirements.

Additionally, there is no need for exact parallel processing like in dual modular redundant systems and application states are preserved in case of failure without requiring any support from application entities so that methods that replicate/synchronize application states, which require specifically designed and built applications are not necessary.

Additionally, the gateway entity can have a lightweight application logic that can easily be implemented and only the gateway entity must be fault tolerant in the standard way, which is not complex by itself and can protect many non-high-availability application entities.

The invention has been described by making reference to specific detailed embodiments. This serves to make the invention more readily understandable to a skilled reader, but has no limiting effect on the invention, which is defined by the appended claims. Reference signs in the claims serve to make the claims easier to read, but also have no limiting effect.

The invention claimed is:

1. A gateway entity for connecting at least two application entities with a communication network, the application entities independently running the same application that conforms to rules of a predetermined protocol, wherein the rules prescribe at least one sequence of messages, the sequence comprising at least two sequence steps, and wherein sequence step information is derivable for each message and is different from one sequence step to another, but is the same for two messages that are generated at the same sequence step in the independently running application entities, the gateway entity including a message handler comprising:

a receiver for receiving outbound messages from the application entities;

means for determining sequence step information in an outbound message;

a memory for holding previously stored sequence step information; and control means for controlling the receiver, the determining means, and the memory, the control means including:

means for comparing the determined sequence step information with the previously stored sequence step information in the memory;

means for writing the determined sequence step information into the memory if the result of comparison indicates that the determined sequence step information is not present in the memory in the form of the previously stored sequence step information;

means for processing the outbound message as a first message of a given sequence step if the results of comparison indicates that the determined sequence step information is not present in the memory in the form of the previously stored sequence step information; and means for processing the outbound message as a further message of the given sequence step if the result of comparison indicates that the determined sequence step information is present in the memory in the form of the previously stored sequence step information.

2. The gateway entity of claim 1, wherein the predetermined protocol provides for transactions consisting of an initial message and at least one response message, a transaction identifier being derivable for each message, wherein the transaction identifier is different from one transaction to another, the gateway entity further comprising means for determining a transaction identifier from a message received at the gateway entity from an application entity or the network.

3. The gateway entity of claim 2, wherein the memory also holds transaction identifiers, and the control means also includes:

means for comparing a determined transaction identifier with transaction identifiers stored in the memory;

means for writing the determined transaction identifier into the memory;

means for processing the message as an initial message if the determined transaction identifier is not present in the memory; and means for processing the message as a response message if the determined transaction identifier is present in the memory.

4. The gateway entity of claim 1, wherein the means for processing the outbound message as a first message of a given sequence step includes means for forwarding the outbound message to the network.

5. The gateway entity of claim 1, wherein the means for processing the outbound message as a further message of a given sequence step includes means for discarding the outbound message.

6. The gateway entity of claim 1, further comprising an inbound message multiplier for receiving an inbound message from the network, producing copied versions of the inbound message, and forwarding a version of the inbound message to each of the application entities.

7. The gateway entity of claim 1, further comprising an entry remover and a timer for removing an entry from the memory after a predefined time period has elapsed.

8. The gateway entity of claim 7, wherein the predefined time period is longer than a time needed for a transaction and/or a sequence.

9. The gateway entity of claim 1, further comprising a mapping database for storing individual records of a message identified by a transaction identifier.

10. A method of controlling a gateway entity connected to at least two application entities and a communication network, the application entities independently running the same application that conforms to rules of a predetermined protocol, wherein the rules prescribe at least one sequence of messages, the sequence comprising at least two sequence steps, and wherein sequence step information is derivable for each message and is different from one sequence step to another, but is the same for two messages that are generated at the same sequence step in the independently running application entities, the method comprising the steps of:

receiving outbound messages from the application entities;

determining sequence step information in an outbound message; and comparing the determined sequence step information with previously stored sequence step information in a memory;

writing the determined sequence step information into the memory if the result of comparison indicates that the determined sequence step information is not present in the memory in the form of the previously stored sequence step information;

processing the outbound message as a first message of a given sequence step if the result of comparison indicates that the determined sequence step information is not present in the memory in the form of the previously stored sequence step information; and processing the outbound message as a further message of the given sequence step if the result of comparison indicates that the determined sequence step information is present in the memory in the form of the previously stored sequence step information.

11. The method of claim 10, wherein the step of processing the outbound message as a first message of a given sequence step includes determining a transaction identifier from the first outbound message received at the gateway entity;

wherein the predetermined protocol provides for transactions consisting of an initial message and at least one response message, and the transaction identifier is derivable for each message and is different from one transaction to another.

12. The method of claim 11, wherein the transaction identifier is a function of at least one individual record of a message.

13. The method of claim 11, wherein the transaction identifier is a hash value calculated from at least one individual record of a message.

14. The method of claim 11, wherein the step of processing the outbound message as a first message of a given sequence step also includes:

comparing the determined transaction identifier of the first outbound message with transaction identifiers stored in a memory;

writing the determined transaction identifier into the memory;

processing the first outbound message as an initial message if the determined transaction identifier is not present in the memory; and forwarding the first outbound message as a response message to the network if the determined transaction identifier is present in the memory.

15. The method of claim 14, wherein the step of processing the first outbound message as an initial message if the determined transaction identifier is not present in the memory includes adding to a mapping database, the determined transaction identifier of the first outbound message and an individual record contained in the first outbound message, said record being particular to the application entity sending the first outbound message.

16. The method of claim 15, wherein the step of processing the first outbound message as an initial message includes replacing the individual record of the first outbound message by a predetermined record.

17. The method of claim 15, wherein a particular individual record is different from one application entity to another for messages with the same sequence step information, and according to the protocol is expected by a given application entity to be contained in a response inbound message to an initial outbound message sent by the given application entity.

18. The method of claim 15, wherein a transaction identifier is a function of an individual record.

19. The method of claim 10, wherein the step of processing the outbound message as the first message of a given sequence step includes forwarding the outbound message to the network.

20. The method of claim 10, wherein the step of processing the outbound message as a further message of a given sequence step includes determining a transaction identifier from the further outbound message received at the gateway entity;
wherein the predetermined protocol provides for transactions consisting of an initial message and at least one response message and the transaction identifier is derivable for each message and is different from one transaction to another.

21. The method of claim 20, wherein the step of processing the outbound message as a further message of a given sequence step also includes:
comparing the determined transaction identifier of the further outbound message with transaction identifiers stored in a memory;
processing the further outbound message as an initial further outbound message if the determined transaction identifier is not present in the memory; and
discarding the further outbound message if the determined transaction identifier is present in the memory.

22. The method of claim 21, wherein the step of processing the outbound message as an initial further outbound message if the determined transaction identifier is not present in the memory includes adding to a mapping database, the determined transaction identifier of the further outbound message and an individual record contained in the further outbound message, said record being particular to the application entity sending the further outbound message.

23. The method of claim 22, wherein the mapping database further includes a transaction identifier of the first outbound message having the same sequence step information as the further outbound message and an individual record of the first outbound message, which is particular for the application entity sending the first outbound message.

24. The method of claim 23, wherein the mapping database maps the individual record of the initial further outbound message identified by its determined transaction identifier to the individual record of the first outbound message.

25. The method of claim 10, wherein the step of processing the outbound message as a further message of a given sequence step includes discarding the further outbound message.

26. The method of claim 10, further comprising the steps of:
receiving an inbound message from the network;
producing copied versions of the inbound message; and
forwarding a version of the inbound message to each of the application entities.

27. The method of claim 10, further comprising determining a transaction identifier from an inbound message received at the gateway entity;
wherein the predetermined protocol provides for transactions consisting of an initial message and at least one response message and the transaction identifier is derivable for each message and is different from one transaction to another.

28. The method of claim 27, further comprising the steps of:
comparing the determined transaction identifier of the inbound message with transaction identifiers stored in a memory;
writing the determined transaction identifier of the inbound message into the memory;
processing the inbound message as an initial inbound message if the determined transaction identifier is not present in the memory; and
processing the inbound message as a response inbound message if the determined transaction identifier is present in the memory.

29. The method of claim 28, wherein the step of processing the inbound message as a response inbound message includes replacing an individual record of the response inbound message using a mapping database by another individual record of an outbound message stored in the mapping database.

30. The method of claim 29, wherein the mapping database maps for each copied version of a response inbound message, an individual record of the copied version of the response inbound message corresponding to an individual record of a first outbound message to an individual record of a further outbound message, wherein the individual record of the further outbound message defines an application entity to be provided with the copied version of the inbound message.

31. The method of claim 29, wherein the step of processing the inbound message as a response inbound message includes forwarding the response inbound message to a corresponding application entity.

32. The method of claim 10, further comprising removing an entry from the memory after a predefined time period has elapsed.

33. The method of claim 32, wherein the predefined time period is longer than a time needed for a transaction or a sequence.

34. The method of claim 10, wherein the sequence step information is a function of at least one individual record of a message.

35. The method of claim 10, wherein the protocol used is the session initiation protocol (SIP).

36. A computer program loaded on an internal memory of a controller of a gateway entity connected to at least two application entities and a communication network, the application entities independently running the same application that conforms to rules of a predetermined protocol, wherein the rules prescribe at least one sequence of messages, the sequence comprising at least two sequence steps, and wherein sequence step information is derivable for each message and is different from one sequence step to another, but is the same for two messages that are generated at the same sequence step in the independently running application entities, wherein the computer program comprises software code portions for performing the following steps when the computer program is run on a processor of the gateway entity:
receiving outbound messages from the application entities;
determining sequence step information in an outbound message; and
comparing the determined sequence step information with previously stored sequence step information in a memory;

writing the determined sequence step information into the memory if the result of comparison indicates that the determined sequence step information is not present in the memory in the form of the previously stored sequence step information;

processing the outbound message as a first message of a given sequence step if the result of comparison indicates that the determined sequence step information is not present in the memory in the form of the previously stored sequence step information; and processing the outbound message as a further message of the given sequence step if the result of comparison indicates that the determined sequence step information is present in the memory in the form of the previously stored sequence step information.

* * * * *

UNITED STATES PATENT AND TRADEMARK OFFICE
CERTIFICATE OF CORRECTION

| | | |
|---|---|---|
| PATENT NO. | : 8,072,982 B2 | Page 1 of 1 |
| APPLICATION NO. | : 12/161815 | |
| DATED | : December 6, 2011 | |
| INVENTOR(S) | : Barta et al. | |

It is certified that error appears in the above-identified patent and that said Letters Patent is hereby corrected as shown below:

In Column 3, Lines 7-8, delete "transacation," and insert -- transaction, --, therefor.

In Column 3, Line 14, delete "prediction" and insert -- predicted --, therefor.

In Column 3, Line 15, delete "stragegies" and insert -- strategies --, therefor.

In Column 3, Line 24, delete "session" and insert -- sessions --, therefor.

In Column 13, Line 43, delete "detail;" and insert -- detail, --, therefor.

In Column 20, Line 7, in Claim 10, delete "message; and" and insert -- message; --, therefor.

In Column 22, Line 64, in Claim 36, delete "message; and" and insert -- message; --, therefor.

Signed and Sealed this
Twenty-first Day of February, 2012

David J. Kappos
*Director of the United States Patent and Trademark Office*